United States Patent [19]

Kluth

[11] Patent Number: 4,464,684

[45] Date of Patent: Aug. 7, 1984

[54] VIDEO RECORDER PROVIDING TRANSIENT-FREE AUDIO SIGNALS

[75] Inventor: Hans-Jürgen Kluth, Garbsen, Fed. Rep. of Germany

[73] Assignee: Licentia Patent-Verwaltungs-GmbH, Frankfurt am Main, Fed. Rep. of Germany

[21] Appl. No.: 394,144

[22] Filed: Jul. 1, 1982

[30] Foreign Application Priority Data

Jul. 1, 1981 [DE] Fed. Rep. of Germany ....... 3125879

[51] Int. Cl.³ ..................... H04N 9/491; H04N 5/782
[52] U.S. Cl. .................................... 358/310; 358/343; 360/19.1
[58] Field of Search ................ 358/310, 343; 360/19.1

[56] References Cited
FOREIGN PATENT DOCUMENTS 2098376 11/1982 United Kingdom ............... 360/19.1

Primary Examiner—John C. Martin
Assistant Examiner—Jeffrey Sutherland
Attorney, Agent, or Firm—Spencer & Frank

[57] ABSTRACT

A television tape recorder in which a television signal, composed of a picture carrier which is frequency modulated with a video signal and an audio carrier each frequency modulated with an LF audio signal, is recorded along successive oblique tracks of a record carrier such that one successive picture field is recorded along each track. The recorder includes a playback portion composed of two playback heads for alternatingly scanning successive tracks on the record carrier such that successive segments of the modulated audio carrier are picked up by alternate ones of the heads, two separate FM demodulators each connected to a respective playback head for receiving the audio carrier segments picked up by its respective heads and for demodulating those segments, an audio signal path, and a switching device connected between the demodulators and the path for selectively connecting each demodulator to the path during the time when the playback head connected to that demodulator is scanning a track, whereby interference in the audio signal in the path is reduced.

4 Claims, 9 Drawing Figures

VIDEO RECORDER PROVIDING TRANSIENT-FREE AUDIO SIGNALS

BACKGROUND OF THE INVENTION

In video recorders it is known to record the video signal of a picture carrier on a tape along so-called oblique tracks which extend at an angle of about 6° to the longitudinal direction of the tape. Preferably, one picture field is recorded along each such oblique track. Recording and playback are effected with two heads which alternatingly scan successive oblique tracks.

In such devices, a stationary head records the audio signal on, and plays it back from, a longitudinal track having a width of about 1 mm and extending parallel to the edge of the tape. Thus it is the longitudinal velocity of the tape and not the substantially higher relative velocity between the head and tape on the oblique tracks which has the controlling influence on recording and playback of the audio signal.

In practice, the longitudinal velocity of the tape is reduced to values of the order of magnitude of 2 cm/s in order to increase the total playing time of the tape. This low relative velocity between the tape and the audio head has an adverse influence on the quality of the recorded audio signal. High fidelity sound quality is practically impossible to achieve with such a low relative velocity and the recorded audio signal only has a frequency range of about 70 Hz to 7–10 kHz.

Due to the narrow width of the longitudinal track, there also results a relatively poor signal-to-noise ratio which becomes even worse if two audio signals are recorded for stereo playback since the width of each channel is then of necessity half that of the longitudinal track.

It is conceivable to record the audio signal along the oblique tracks together with the picture carrier in a manner similar to that employed for video discs. However, such a solution has not yet been successfully reduced to practice. On the one hand, the available frequency band is already utilized completely. The range from 0 to 1.3 MHz is taken up by the reduced-frequency, quadrature modulated chrominance subcarrier and the rest of the frequency band is occupied by the frequency spectrum of the modulated picture carrier. Recording of the audio carrier in the remaining narrow frequency gap between the modulated chrominance subcarrier and the frequency spectrum of the picture carrier is practically impossible because of the required steep filter band edges for the chrominance subcarrier and the picture carrier, due to the occurring phase and group delay errors.

On the other hand, if the audio signal is recorded on the oblique tracks, there results considerable interference during playback due to the switching between video heads, which does not interfere with picture playback because it takes place during the vertical blanking periods. During playback of the audio signal, however, this switching of heads at a frequency of 50 Hz becomes audible as an annoying noise component because the playback of the audio signal, which is modulated, for example, on a carrier, is temporarily interrupted due to the switching of heads. The resulting spike-type interference pulses at a fundamental frequency of 50 Hz with a large harmonics content produce a continuous, annoying noise during audio playback.

SUMMARY OF THE INVENTION

It is an object of the invention to reduce the audio interference occurring during playback and resulting from the switching of heads during recording of the audio signal on the track of the video carrier.

The above and other objects are achieved, according to the invention, by the provision of a television tape recorder in which a television signal, composed of a picture carrier which is frequency modulated with a video signal and an audio carrier frequency modulated with an LF audio signal, is recorded along successive oblique tracks of a record carrier such that one successive picture field is recorded along each track, which recorder includes a playback portion composed of transducer means composed of two playback heads for alternatingly scanning successive tracks on the record carrier such that successive segments of the modulated audio carrier are picked up by alternate ones of the heads, two separate FM demodulators each connected to a respective playback head for receiving the audio carrier segments picked up its respective heads and for demodulating those segments, means defining an audio signal path, and switching means connected between the demodulators and the path for selectively connecting each the demodulator to the path during the time when the playback head connected to that demodulator is scanning a track, whereby interference in the audio signal in the path is reduced.

The invention is based on the following considerations and realizations. If the necessary switching between the two videoheads takes place in the path of the scanned FM audio carrier, unavoidable phase jumps occur in the signal at the input of the single FM demodulator. Such phase jumps are recorded as signals in an FM demodulator and produce noise in the audio, or LF, signal at the output. Since this noise is repeated at a frequency of 50 Hz, an audible crackle is present in the played back audio signal. This noise appears even if the switching of heads takes place properly and within an extremely short time.

Switching within the LF signal, however, can be performed without audible interference in playback. Such switching is possible with commercially available switching modules, such as, for example, integrated circuits, and is used in studios, for example, to cut in a substitute signal if there is drop-out interference. The above-mentioned noise as a result of phase jumps no longer occurs because no switching takes place in the path of the audio carrier and the switching in the LF signal takes place at a time in which both video heads, due to the overlap in their scanning periods, furnish an uninterrupted audio carrier and thus both FM demodulators also furnish an uninterrupted LF audio signal.

Although this requires more circuitry in that a total of two FM demodulators are required for an audio signal, the necessary additional expenditure can be kept low by the use of integrated circuits. The present invention can be used independently of the recording system employed, i.e. for the VHS system, the Betamax system, the Video 2000 system and for other systems employing oblique track recording and a plurality of video heads.

The invention permits the realization of a signal to noise ratio of >50 dB. That means that the change of heads no longer produces an audible interference during audio playback.

One embodiment of the invention will now be described with reference to the drawings.

DESCRIPTION OF THE PREFERRED EMBODIMENTS

Figure 1:
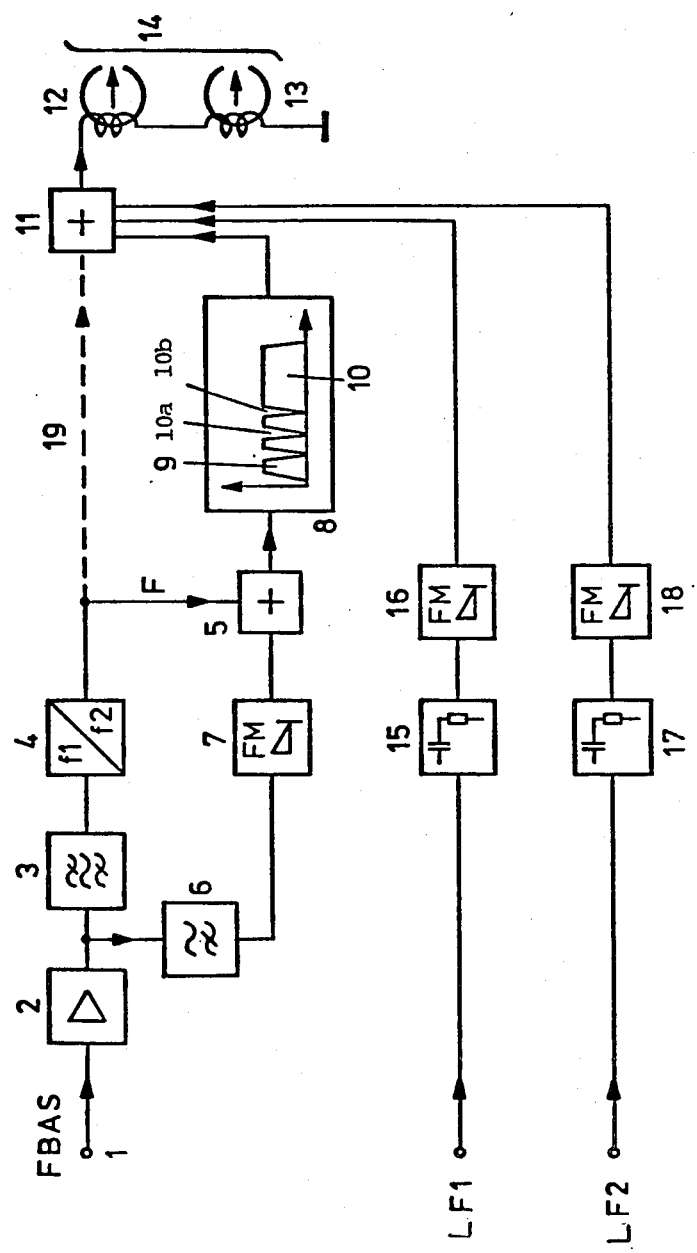
FIG. 1 is a block circuit diagram of a video recorder recording system in accordance with the invention.

In the recording system shown in FIG. 1, an FBAS signal from terminal 1 is fed to an amplifier 2. By means of a filter 3, a modulated PAL chrominance subcarrier F of 4.43 MHz is evaluated and reduced to a frequency of 0.63 MHz in frequency converter 4. This chrominance subcarrier F is fed to one input of an adder stage 5. The luminance signal Y is evaluated in lowpass filter 6 and modulated onto a carrier in the FM modulator 7. The modulated carrier is also fed to the adder stage 5.

The output signal from the adder stage 5 is fed to a filter 8. This filter has a transmission band 9 for the reduced frequency chrominance subcarrier F and a transmission band 10 for the picture carrier modulated with the signal Y. The transmission band 10 includes a blocking region 10a at 1.92 MHz and a further blocking region 10b at 2.17 MHz.

The output of filter 10 is connected to an input of the adder stage 11 whose output is connected to the two video heads 12 and 13, which are connected together in series. Alternating from field to field, the video transducer heads 12 and 13 record the television signal on tracks which extend obliquely at an angle of 6° to the edges of the magnetic tape 14.

An audio signal LF 1 is fed, via a pre-emphasis stage 15, having a time constant of 50 $\mu$s and serving to raise the amplitudes of the high frequency components, to the FM modulator 16. FM modulator 16 generates an audio carrier frequency modulated with LF 1 at a center frequency of 1.92 MHz with a frequency deviation of ±50 KHz. This modulated carrier is likewise fed to the adder stage 11. A second audio signal LF 2 is fed to an FM modulator 18 via a corresponding pre-emphasis stage 17 similar to stage 15. The FM modulator 18 furnishes an audio carrier frequency modulated with LF2 at a center frequency of 2.17 MHz with a frequency deviation of ±50 KHz. This second audio carrier is also fed to the adder stage 11.

Thus the following are recorded on the tape: the reduced frequency chrominance subcarrier F in the transmission band 9 of the filter 10; the picture carrier coming from modulator 7 and frequency modulated with the signal Y in transmission band 10; the audio carrier modulated with LF 1 in the blocking region 10a of the filter 8; and the audio carrier frequency modulated with LF 2 in the blocking region 10b of filter 8. The blocking regions 10a and 10b serve to cut out the frequency ranges of the modulated picture carrier occupied by the audio carriers and to reduce interference in the sound from the picture signal. Preferably, filter 8 is constituted by notch filters.

Supplying the chrominance subcarrier F to the modulated picture carrier delivered to filter 8 has the following advantage. The chrominance subcarrier F actually occupies only the frequency band indicated by the transmission band 9 of filter 8, i.e. a frequency range from 0.63 MHz ±500 KHz. In practice, however, this modulated chrominance subcarrier also includes frequency components which lie higher and fall into the frequency bands occupied by the two audio carriers. This may cause the chrominance subcarrier to produce interference in the sound. In the illustrated circuit, such frequency components of the chrominance subcarrier F in the blocking regions 10a and 10b are eliminated again. In principle, however, the chrominance subcarrier F can also be added directly to the adder stage 11 via line 19. Then filter 8 need not have the transmission band 9.

Figure 2:
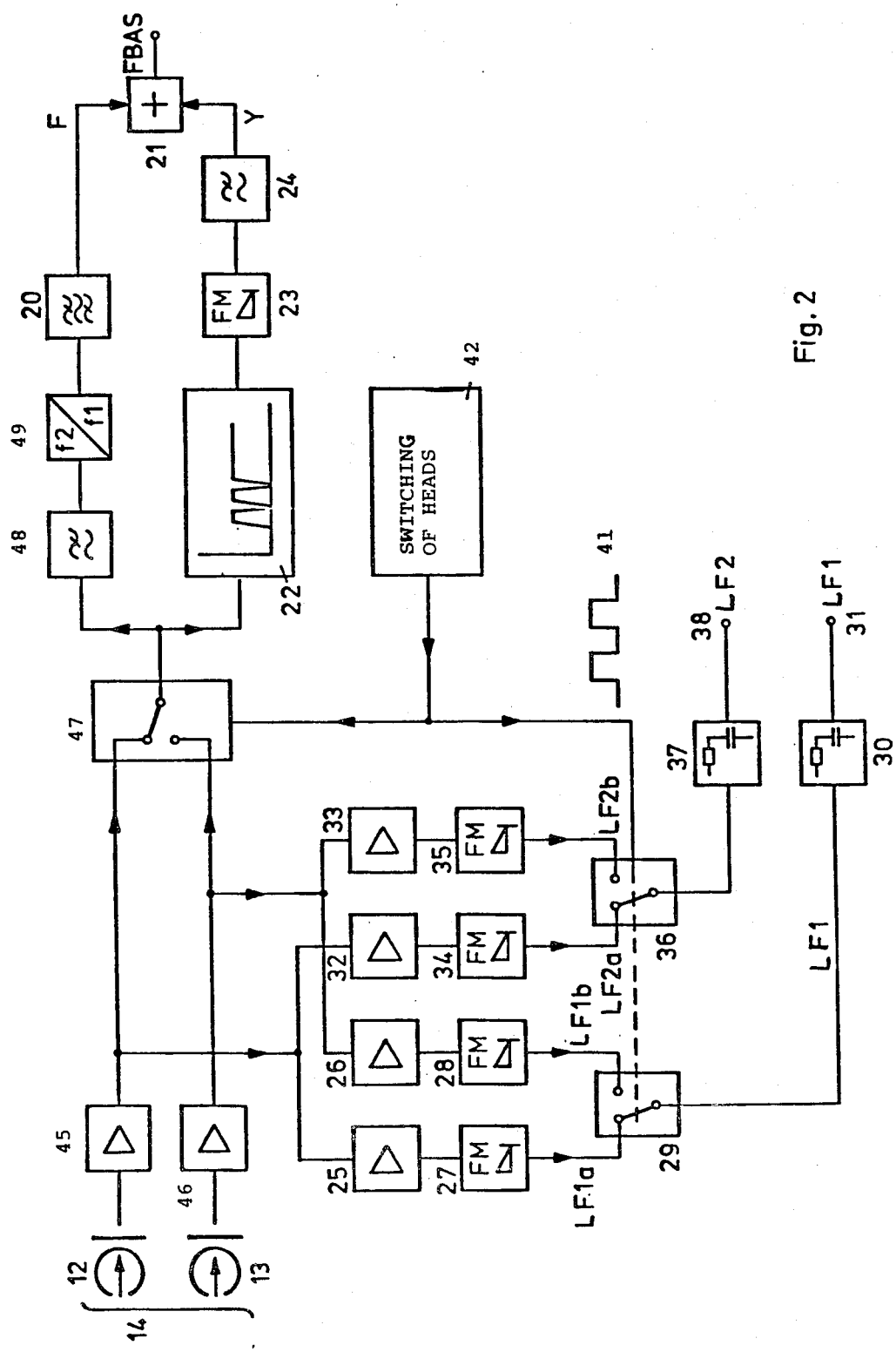
FIG. 2 is a block circuit diagram of a video recorder playback system according to a preferred embodiment of the invention.

FIG. 2 shows a playback circuit according to the invention for the signal recorded by the circuit of FIG. 1. The signals from the two video heads 12, 13 reach the two inputs of a switch 47 via respective preamplifiers 45 and 46. Switch 47 is actuated by head change pulses 41 produced by a head switching control unit, or head wheel, 42 at the beginning of each field and furnishes a continuous signal at its output. From this signal, the chrominance subcarrier F is selectively filtered by means of lowpass filter 48, is then reconverted in a frequency converter 49 to the original PAL chrominance subcarrier frequency of 4.43 MHz, and is fed, via a bandpass filter 20, to one input of an adder stage 21.

By means of a frequency selective filter 22, which may be composed of two notch filters, the modulated picture carrier in the transmission band 10 of FIG. 1 is selectively passed. The transmission curve of the filter 22 again includes two blocking regions at the frequencies 1.92 MHz and 2.17 MHz. The picture carrier reaches an FM demodulator 23 which furnishes, via a lowpass filter 24, the luminance signal Y to the adder stage 21. At the output of the adder stage there thus appears the FBAS signal for picture playback.

The output signals of the preamplifiers 45, 46 are also fed to two selective amplifiers 25, 26 which are each tuned to a frequency of 1.92 MHz. The selectively filtered audio carriers are fed to two respective FM demodulators 27 and 28. Thus demodulator 27 furnishes the audio signal LF 1a derived from video head 12 and demodulator 28 furnishes the audio signal LF 1b derived from video head 13.

Switch 29, which is also actuated by the head changing pulses 41, lies in the paths of these LF audio signals. Switch 29 furnishes a continuous audio signal LF 1 which comes, alternatingly from field to field, from video head 12 and from video head 13. This signal is fed through a de-emphasis stage 30 having a time constant of 50 $\mu$s and appears at terminal 31 as an equalized audio signal LF 1 which no longer has any interference resulting from the switching between heads.

In the same manner the continuous audio signal LF 2 is obtained at terminal 38 via amplifiers 32 and 33 each tuned to the frequency 2.17 MHz, a switch 36, and a de-emphasis stage 37. The signals LF 1 and LF 2 may constitute a stereo signal. They may also represent audio signals containing the same information in different languages.

Figure 3:
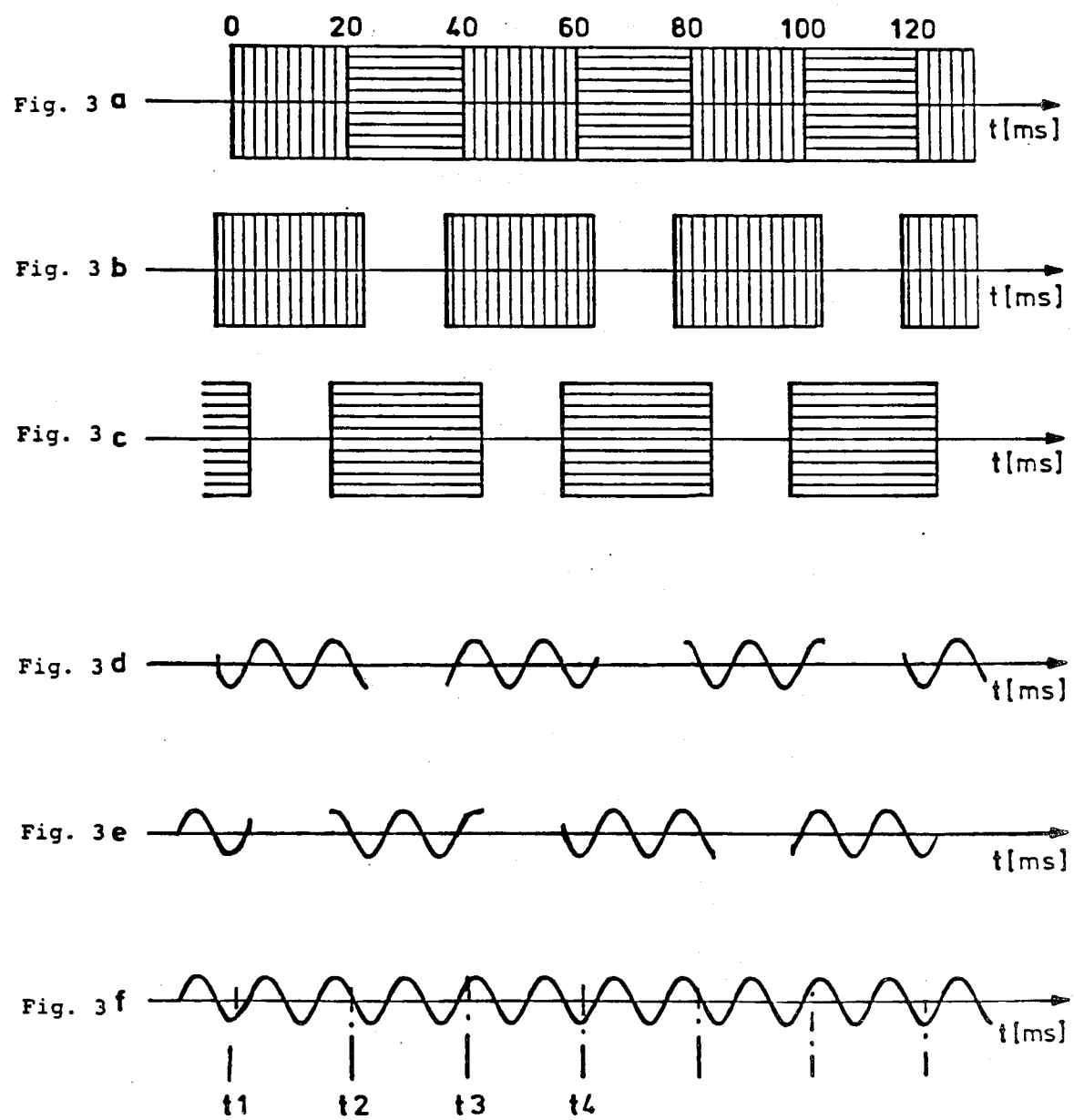
FIGS. 3a–3f are signal diagrams illustrating the operation of the circuit according to FIG. 2.

FIG. 3a depicts the modulated picture carrier segments at the output of switch 47 for successive picture fields each having a duration of 20 ms. The illustrated areas which are alternatingly hatched horizontally and vertically, thus correspond to picture carrier packets which come alternatingly from the two video heads 12 and 13. The signal according to FIG. 3a is generated as hard switching in switch 47. Hard switching means a very rapid abrupt switching without any transients. Switch 47 may be regarded as a very rapid mechanical switch.

Such a hard switching in the path of the carrier frequency signal does not interfere with picture reproduction because during this time, i.e. the vertical blanking time, no picture reproduction takes place. However, for audio playback this would produce an interference signal.

FIG. 3b shows the modulated audio carrier at the output of amplifier 25 or 32, and FIG. 3c shows the modulated audio carrier at the output of amplifier 26, or 33. The scanning performed by the video heads 12 and 13 has a period of overlap so that for a period of about 1 ms, an audio carrier is present from head 12 as well as an audio carrier from head 13. By demodulating the audio carrier depicted in 3b, the LF signal represented in FIG. 3d is produced. Correspondingly, demodulation of the audio carrier of FIG. 3c produces the LF signal represented in FIG. 3e. The resulting LF signals thus also have a period of overlap.

At times t1, t2, t3, t4 . . . switching occurs by means of switch 29, or 36. This is thus an inertia free, hard transition between the LF signals of FIG. 3d and FIG. 3e. This produces the continuous LF audio signal depicted in FIG. 3f which is available at terminal 31 and contains no interference signals that become audible during audio playback since switching occurs between signals which are in phase with one another. The same applies for the processing of the audio signal LF 2.

Figure 4:
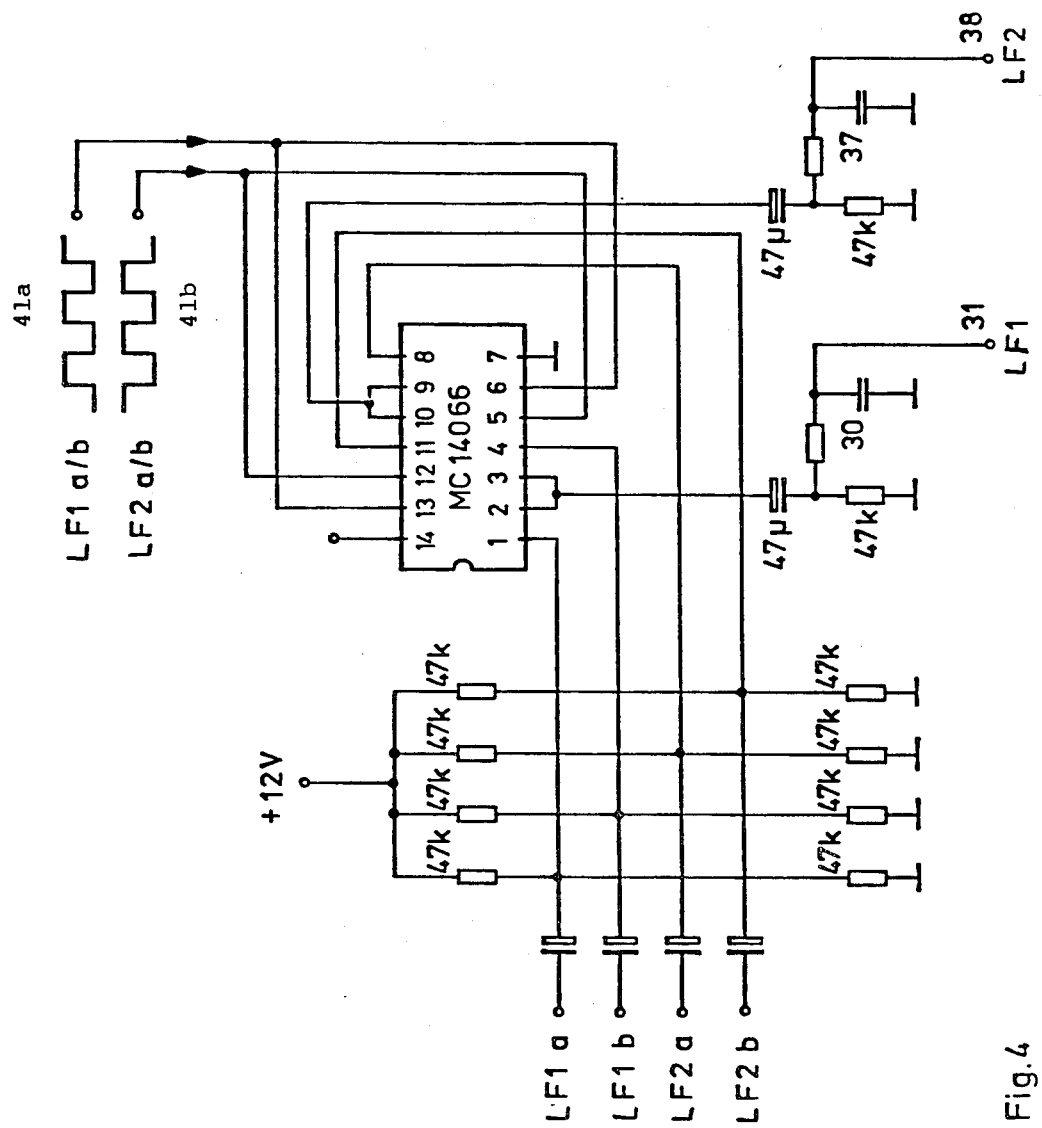
FIG. 4 is a circuit diagram of a circuit tested in practice for realizing LF switching for two recorded audio signals in the circuit of FIG. 2.

FIG. 4 shows a suitable preferred embodiment of switches 29 and 36 of FIG. 2. The signals LF 1a, LF 1b, LF 2a and LF 2b are applied in the illustrated manner to an integrated circuit of the type MC 14066 which acts as a switch. This circuit is additionally controlled by two opposite-phase head change pulse signals 41a and 41b. The pulse signal 41a causes switching in the path of signal LF 1, corresponding to the function performed by switch 29 of FIG. 2 and the signal 41b causes switching in the path of signal LF 2 corresponding to the function of switch 36 of FIG. 2. The integrated circuit employed may be, for example, an IC of the type MC 14066 B made by Motorola. The various signal parameters involved in a circuit according to the invention, such as the line scanning period, can be varied depending on the broadcast system in use.

It will be understood that the above description of the present invention is susceptible to various modifications, changes and adaptations, and the same are intended to be comprehended within the meaning and range of equivalents of the appended claims.

What is claimed is:

1. A television tape recorder in which a television signal, composed of a picture carrier which is frequency modulated with a video signal and an audio carier frequency modulated with an LF audio signal, is recorded along successive oblique tracks of a record carrier such that one successive picture field is recorded along each track, said recorder including a playback portion comprising: transducer means composed of two playback heads for alternatingly scanning successive tracks on the record carrier such that successive segments of the modulated audio carrier are picked up by alternate ones of said heads; two separate FM demodulators each connected to a respective playback head for receiving the audio carrier segments picked up its respective heads and for demodulating those segments; means defining an audio signal path; and switching means connected between said demodulators and said path for selectively connecting each said demodulator to said path during the time when the playback head connected to that demodulator is scanning a track; whereby interference in the audio signal in said path is reduced.

2. A recorder as defined in claim 1 further comprising means for producing switching pulses synchronized with the alternation between said playback heads of scanning of said record carrier and connected for actuating said switching means in response to said switching pulses.

3. A recorder as defined in claim 1 including a recorder portion comprising: means for frequency modulating the picture carrier with the video signal to produce a modulated picture carrier; and filter means connected to pass the modulated picture carrier and having a blocking region corresponding to the frequency range of the modulated audio carrier.

4. A recorder as defined in claim 1 wherein: the television signal further includes a chrominance subcarrier; said recorder portion further comprises means adding the chrominance subcarrier to the modulated picture carrier in front of said filter means; and said filter means presents a pass band in the frequency range of the chrominance subcarrier and its sidebands.

* * * * *